Feb. 6, 1968   C. SUBIETA-GARRON   3,368,141
TRANSFORMER IN COMBINATION WITH PERMANENT MAGNET
Filed Sept. 23, 1964   2 Sheets-Sheet 1
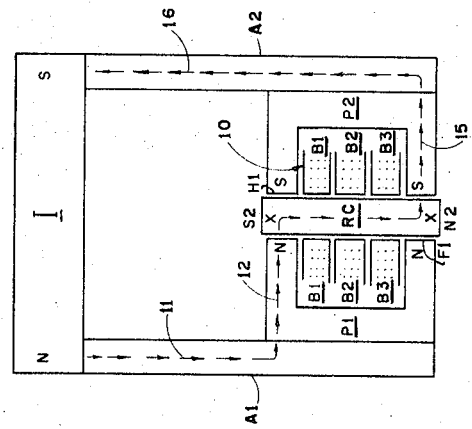
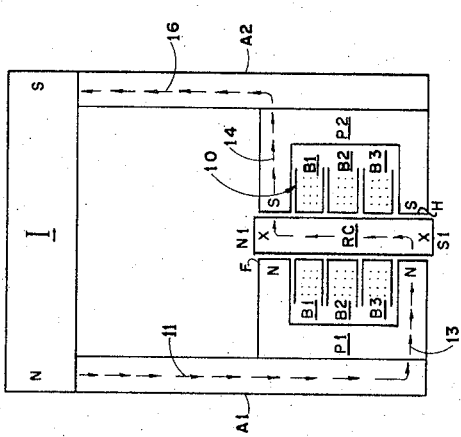
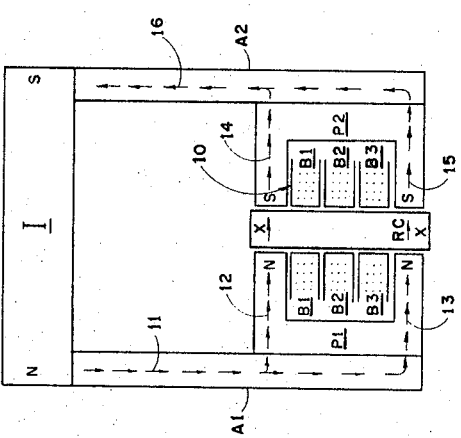
INVENTOR
CARLOS SUBIETA-GARRON
BY
Mason, Mason & Albright
ATTORNEYS Feb. 6, 1968  C. SUBIETA-GARRON  3,368,141
TRANSFORMER IN COMBINATION WITH PERMANENT MAGNET
Filed Sept. 23, 1964  2 Sheets-Sheet 2
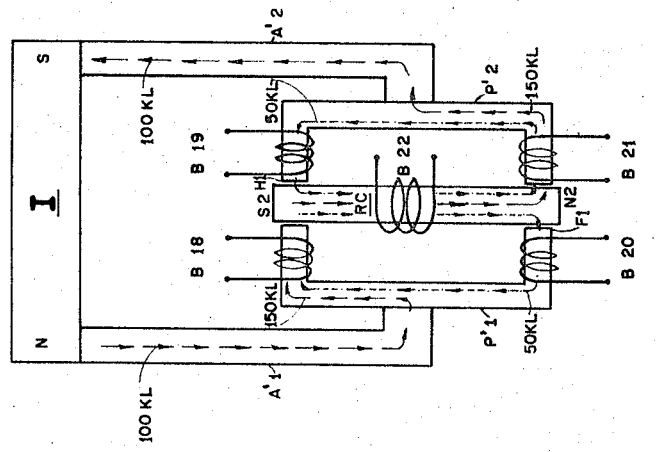
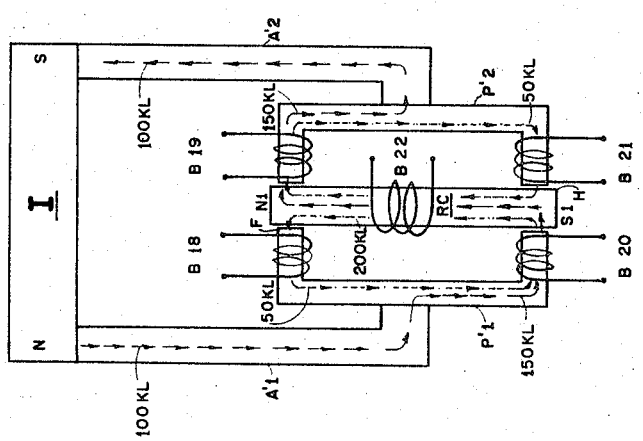
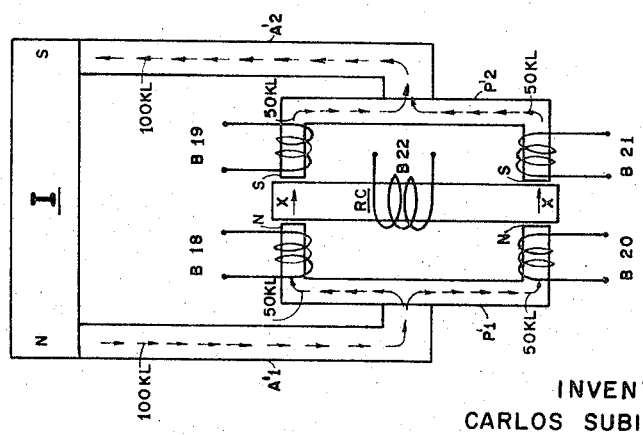
INVENTOR
CARLOS SUBIETA-GARRÓN United States Patent Office 3,368,141
Patented Feb. 6, 1968

3,368,141
TRANSFORMER IN COMBINATION WITH
PERMANENT MAGNET
Carlos Subieta-Garron, Ave. Libertador Bolivar 309,
Calacala, Cochabamba, Bolivia
Filed Sept. 23, 1964, Ser. No. 398,604
6 Claims. (Cl. 323—44)

ABSTRACT OF THE DISCLOSURE

A permanent magnet in combination with a transformer having first and second windings about a core, there being two paths for magnetic flux leading from each pole of the permanent magnet to either end of the core so that when an alternating current induces magnetic flux direction changes in the core the magnetic flux from the permanent magnet is automatically directed through the path which corresponds with the direction taken by the magnetic flux through the core due to the current, whereby the magnetic flux in the core is intensified.

Summary and objects of the invention

The invention relates to a system for intensifying an electrical current. More particularly, it concerns a method and apparatus for the selective combining of the magnetic flux induced by an alternative electrical current in a high-permeability material with that of a permanent magnet.

It is fundamental that in a transformer the voltage ratio between the primary and the secondary windings is a function of the turns ratio. Thus, except for transformer losses, $N_1 I_1 = N_2 I_2$ in which $N_1$ is the number of turns of the primary, $N_2$ is the number of turns of the secondary and $I_1$ and $I_2$ are the effective currents in the primary and secondary, respectively. With efficient transformers, the voltage ratio is very nearly $N_1/N_2$. Losses which occur in a transformer are largely iron losses which appear as heat and require removal. For maximum power transfer, the magnetic hysteresis loop should be narrow. At the same time, both the primary and secondary circuits should operate at their characteristic impedance. While ideally an alternating current generator would produce a sine wave output with the voltage and current in exact phase, in practice this does not occur and the wave form of the output voltage and current is frequently modified by harmonics and other factors. Where a circuit operates at its characteristic impedance and the voltage and current output wave forms are satisfactory, the efficiency or power factor of the circuit approaches unity. Also, since it is not difficult to demonstrate that the economy of power transmission varies as the square of the power factor, it is extremely desirable to operate at a unity power factor. But because of the factors discussed above, the induction characteristics of most electrical loads, and the capacitive effect of the transmission line itself; the current of the transmission line tends to vary from lagging to leading, or vice versa with the load although usually it tends to lag. For such reason, synchronous motors, static capacitors and the like are incorporated in the circuit to increase the power factor.

It is an object of this invention to provide apparatus and method which increase the power factor of a circuit.

A further object of the invention is the inclusion of a transformer in an alternating electrical circuit which improves the voltage and current wave form of the circuit— particularly at distant points of delivery.

A still further object and advantage of the invention is the provision of means to intensify electrical current output by the selective adding of the magnetic flux of a permanent magnet to that induced in a transformer to intensify the electrical current delivered from the transformer.

A yet further advantage of the invention lies in the delivery of an electrical current from a transformer of an intensity above that which would be otherwise expected from a number of secondary windings involved.

Another major advantage of the invention lies in the delivery of electrical power to rural and other areas where the price of electricity is high. In such locations, expenditures for conversion required to practice the instant invention are quickly regained from the savings in costs to the powerhouse in supply requirements.

Other objects, adaptabilities, and capabilities will appear as the description progresses, reference being had to the accompanying drawing.

Description of the drawings

FIGURE 1 is a diagrammatic illustration of apparatus in accordance with the invention wherein electrical current is not passing through the primary;

FIGURE 2 is an illustration similar to FIGURE 1 wherein current is flowing through the primary coil and inducing a magnetic flux in the core member of the apparatus;

FIGURE 3 is an illustration similar to FIGURE 2 except that current in the primary is flowing in an opposite direction and the disposition of the magnetic flux in the core member is reversed.

FIGURE 4 shows a modified apparatus of the invention wherein electrical current is not passing through the primary;

FIGURE 5 is similar to FIGURE 4 with the current passing through the primary coil in one direction; and FIGURE 6 is similar to FIGURE 4 but with the current passing through the primary coil in the opposite direction.

Description of the preferred embodiments

In the figures, the reference character I represents a permanent magnet with its poles marked N and S for the north and south magnetic poles thereof, respectively. Leading from the north pole of the magnet I is an armature A1 which is composed of a magnetic material having a high permeability so as to carry substantially all of the magnetic flux which emanates from said pole. A similar armature A2 leads from the south pole of the magnet I. The armatures A1 and A2 join with pole shoes P1 and P2, respectively, of a transformer designated generally by reference numeral 10. The primary coils of the transformer 10 are represented by reference characters B1 and B3 whereas the core and magnetic flux bridge member about which coils B1 and B3 are wound is designated RC. The secondary coil, also wound around the core member RC is designated B2.

In FIGURE 1 with no current flowing through the coils B1, B2 and B3, the magnetic flux from the magnet I follows the paths designated by arrows 11, 12, 13, 14, 15 and 16. It will thus be noted that the flux path 11 splits into two paths 12 and 13 which traverse the terminal or bridge portions X of core member RC and are carried by paths 14 and 15 to be joined by path 16 to the south pole of magnet I thus completing the magnetic circuit. It will be appreciated that the magnetic flux contained in path 11 is split into approximately equal quantities carried through path 12–X–14 on the upper part of core member RC and path 13–X–15 on the lower part of core member RC. Also, of course, the magnetic orientation of the armatures A1 and A2, the pole shoes P1 and P2 and the bridge portions X is dominated by the disposition of the magnetic flux.

When current is circulated through the primary coils B1 and B3 in a direction so that a magnetic flux is induced in core member RC to render the north pole at N1 and the south pole at S1, the magnetic orientation of the pole shoes P1 and P2 and the bridge portions X is modified so that the magnetic flux flows between paths 11 and 16 through the 13–X–RC–X–14 path shown in FIGURE 2. Because of the proximity of like poles at locations F and H, the conduction of magnetic flux is severely inhibited at such locations and for practical purposes the number of lines of magnetic flux in the 13–X–RC–X–14 path emanating from magnet I, as shown in FIGURE 2, will be equal to the number of lines in FIGURE 1 contained in both the paths 12–X–14 and 13–X–15. This effect takes place practically instantaneously, depending primarily upon the hysteresis qualities of the pole shoes and core member and the characteristics of the current applied through the primary coils B1 and B3. The interaction of the magnetic flux from the permanent magnet I through core member with the current in the primary B1 and B3 is in accordance with well-known physical laws, and it will be appreciated that the flux generated by such current combines with that of the permanent magnet whereby if the fluxes are approximately equal the flux density in core member RC is approximately doubled at its maximum intensity. The interaction tends to align the current and voltage phases in the primary circuit and current induced in the secondary coils is intensified by an improved phase alignment and by the rapid change in flux occurring in the core member RC as the flux from magnet I is channeled through same.

When the current in the primary coils B1 and B3 is reversed, the magnetic orientation of the core member RC and also the pole shoes P1 and P2 is changed so that the path of magnetic flux between paths 11 and 16 assumes the path 12–X–RC–X–15 as shown in FIGURE 3, with substantially the entire flux from magnet I following such path. In this connection it is to be noted that the south pole of the core RC is in this aspect disposed at S2 in the upper portion of RC with the north pole at N2 in the lower portion and the conduction of magnetic flux is accordingly severely restricted at locations H1 and F1 by the proximity of like poles.

It is to be understood that the material making up the armatures A1 and A2, the pole shoes P1 and P2 and the core member RC should not only have a narrow hysteresis loop, but also should be so dimensioned that the maximum permeability exceeds that which they may be subjected to by reason of the magnetic flux from permanent magnet I and that induced by the primary windings B1 and B3.

FIGURES 4, 5, and 6 discloses a further method of carrying out the invention which is advantageous inasmuch as the self-induction of the system is substantially decreased.

Referring now to these FIGURES, it is to be noted that the reference character I is, as previously, a permanent magnet with its poles marked N and S for the north and south poles, respectively. Also, the armatures A′1 and A′2 are essentially the same as armatures A1 and A2 shown in FIGURES 1–3.

The magnet I is saturated with its own flux and the armatures A′1 and A′2 are composed of magnetic material having a high permeability so as to carry substantially all of the magnetic flux which emanates from the poles of the magnet I. The armatures A′1 and A′2 join with pole shoes P′1 and P′2, respectively, also composed of highly permeable material which function as branches for the conduction of magnetic flux from such armatures.

A core member RC which may be structurally the same as the core member having the same reference character in FIGURES 1–3, is disposed adjacent the terminal ends of the pole shoes P′1 and P′2. The core member RC is wound with a primary winding B22 which is adapted for connection to a source of alternating current. Each branch of the pole shoes P′1 and P′2 has a secondary winding, B18 and B20 for pole shoe P′1 and B19 and B21 for pole shoe P′2.

These secondary windings may be connected in series or parallel, or may lead to different circuits, as desired.

Looking now at FIGURE 4 wherein no current is passing through the primary windings B22, it will be assumed for the purpose of illustration that a magnetic flux of 100 kilolines is being conducted from the north pole of the magnet I to the armature A′1 and into the branches of the pole shoe P′1 wherein it is split into a pair of 50 kiloline segments. The path of the flux passes through terminal ends of the core member RC which are designated X and into the branches of the pole shoe P′2 from whence it is conducted through the armature A′2 to the south pole of the magnet I. It is to be noted that the secondary coils B18, B19, B20 and B21 are each cut by a flux of 50 kilolines. But inasmuch as the flux is not changing at this moment, no current is induced in the secondary coils.

In FIGURE 5 an electrical current is circulating in the primary B22 in such a direction as to magnetize the core member RC and to produce a total of 100 kilolines of flux in the core member RC with the north and south poles being indicated by N1 and S1, respectively. It will be appreciated that when current is first initiated through the primary B22 the conduction of magnetic flux at the locations F and H are inhibited and accordingly the 50 kilolines of flux which pass through these points and also through the coils B18 and B21 are diverted so as to pass through the coils B20 and B19. This diversion of magnetic lines which occurs within the windings of B18 and B21 initiates a current in such windings. At the same time the diversion or increase of magnetic lines of force within the windings B19 and B20 causes a similar conduction of current in such windings. As the current in the primary, B22, increases to its maximum amount, a total of 200 kilolines of magnetic flux are conducted in the core member RC as shown in FIGURE 5. However, since the magnet I is saturated, only 100 kilolines are conducted through the armatures A′1 and A′2. The additional 100 kilolines of flux split into the branches of the pole shoes P′1 and P′2 as shown by the arrows on the dot-dash lines so that 50 kilolines are distributed in each of the pole shoes P′1 and P′2. Accordingly, it will be understood that aside from the change in flux which occurs by diversion of the flux path a further 50 kiloline increase occurs in direct response to the electrical current flow in the primary B22 and flux thereby created through each of the secondary coils B18, B19, B20 and B21. When the current is reversed in the primary B22, the magnetic status of the system will almost immediately return to that shown in FIGURE 4. The system goes through the same type of transformation except that the paths of magnetic flux are inhibited at locations H1 and F1 because of the reversal of the north pole of core member RC to N2 and the south pole to S2. Thus an increase in kilolines takes place through coils B18 and B21, first, due to the transformation of the path of magnetic flux from the magnet I and, second, due to the induction of magnetic lines of force by the primary B22 in the opposite direction. Accordingly, the current induced in the coils B18, B19, B20 and B21 is opposed and equal to that previously induced as shown with reference to FIGURE 4.

The maximum permeability of pole shoes P′1 and P′2 should be sufficient to carry the maximum flux which may be induced therein without saturation. So that the assembly will not work as an annular magnet, there should be a small air gap between the core member and shoe poles. Instead of armatures together with a permanent magnet, a curved or horseshoe-shaped magnet may be employed which has poles engaging the pole shoes.

The foregoing detailed description has been given for clearness of understanding only, and no unnecessary limitations should be understood therefrom for further modifications will be obvious to those skilled in the art.

Having described my invention, what I claim as new and desire to cover by Letters Patent of the United States is:

1. The combination of an electromagnetic device and a permanent magnet for use in an alternating current circuit, said combination comprising a permanent magnet, a core member composed of highly permeable material, a primary winding of an electrically conductive material about said core member, an adjacent secondary winding of an electrically conductive material about said core member, said primary winding adapted to have alternating electrical current from said circuit passed therethrough, a magnetic flux circuit means leading from the north pole of said permanent magnet in two further paths to said core member so as to be adjacent said core on each side of said windings, a further magnetic flux circuit means leading from said south pole in two paths to said core so as to be adjacent said core on each side of said windings whereby when an electrical current moves through said winding the magnetic flux from said permanent magnet is conducted from said north pole through one of said paths to said core and thence through one of said further paths to said south pole, the direction of the flux through said core being the same as that induced by said electrical current thereby intensifying the magnetic flux induced by said alternating electrical current in said primary winding.

2. An electrical output source which comprises a permanent magnet, a transformer, an alternating electrical current source connected to primary windings of said transformer, said windings disposed about a core in said transformer, a first magnetic flux path from the north pole to the south pole of said magnetic arranged to pass in a first direction through the core of said transformer, a second magnetic flux path from the north to the south pole of said magnet arranged to pass in a second direction opposite to said first direction through the core of said transformer, the direction of said magnetic flux in said core changed by shifting between said first magnetic flux path and said second magnetic path responsive to changes in the direction of magnetic flux induced in said core by current passing through said primary windings, and a secondary winding about said core for delivering electrical current produced by the alternating magnetic flux in said core, said secondary windings being disposed relative to said paths and said core whereby the magnetic fluxes from said magnet via said paths pass through said secondary windings.

3. In a transformer for alternating electrical current, a core having primary and secondary windings, permanent magnet means, a pair of magnetic flux paths provided for the magnetic flux of said magnet means, the first of said flux paths passing transversely through said core on one side of said windings and the other of said paths passing transversely through said core on the other side of said windings when no current is passing through said windings, the induction of magnetic flux longitudinally in said core by energizing said primary winding inhibiting the conduction of flux transversely through said core and conducting said flux from said permanent magnet means longitudinally through said core in the direction of said induced flux partly through the first of said paths and partly through the second of said paths.

4. Electrical apparatus which comprises a flux saturated permanent magnet, a first magnetic flux conductor connected to the north pole of said magnet composed of highly permeable material, a second magnetic flux conductor connected to the south pole of said magnet composed of highly permeable material, a core member, a primary winding of electrically conductive material around said core member adapted to be connected to an alternating current source and induce an alternating magnetic flux in said core member, said first magnetic flux conductor having first and second branches terminating adjacent said core member on opposite sides of said primary winding, said second magnetic flux conductor also having first and second branches terminating adjacent said core member at opposite sides of said primary winding, the path of said magnetic flux from said permanent magnet passing through said core member in one direction via said first branch of said first conductor and said second branch of said second conductor responsive to magnetic flux induced in said one direction by current passing through said primary winding and through said core member in an opposite direction via said second branch of said first conductor and said first branch of said second conductor responsive to magnetic flux induced in said opposite direction by current passing through said primary winding.

5. Apparatus in accordance with claim 4 wherein secondary windings are provided around each of said branches.

6. Apparatus in accordance with claim 5 wherein the maximum number of magnetic lines induced in said core member by current passing through said primary windings is approximately equal to the magnetic lines conducted from said magnet through said magnetic flux conductors.

References Cited
UNITED STATES PATENTS

| 2,324,634 | 7/1943 | McCreary | 336—110 X |
| 2,563,899 | 8/1951 | Wiancko | 336—110 X |
| 2,802,170 | 8/1957 | Starr et al. | 323—92 |
| 2,819,444 | 1/1958 | Walker | 323—92 |
| 2,913,639 | 11/1959 | Coppola | 335—250 X |
| 2,978,631 | 4/1961 | Wittke | 323—45 |

JOHN F. COUCH, Primary Examiner.

A. D. PELLINEN, Assistant Examiner.